United States Patent [19]
Fujita

[11] Patent Number: 5,041,985
[45] Date of Patent: Aug. 20, 1991

[54] TOOL CHANGING METHOD

[75] Inventor: Naoki Fujita, Tokyo, Japan

[73] Assignee: Fanuc Ltd., Minamitsuru, Japan

[21] Appl. No.: 330,086

[22] PCT Filed: Jul. 20, 1988

[86] PCT No.: PCT/JP88/00724
§ 371 Date: Mar. 22, 1989
§ 102(e) Date: Mar. 22, 1989

[87] PCT Pub. No.: WO89/01194
PCT Pub. Date: Feb. 9, 1989

[30] Foreign Application Priority Data
Jul. 30, 1987 [JP] Japan .................... 62-191376

[51] Int. Cl.$^5$ .............. G06F 15/46; G05B 19/18
[52] U.S. Cl. ............... 364/474.21; 364/192; 29/568
[58] Field of Search ............ 364/191, 192, 167.01, 364/474.11, 474.21, 474.23; 29/568; 318/567, 568, 569

[56] References Cited
U.S. PATENT DOCUMENTS

| | | | |
|---|---|---|---|
| 4,543,636 | 9/1985 | Noda et al. | 364/474.21 |
| 4,616,322 | 10/1986 | Niwa et al. | 364/474.21 |
| 4,667,294 | 5/1987 | Shima et al. | 364/474.21 |
| 4,794,514 | 12/1988 | Hideaki et al. | 364/474.22 |

Primary Examiner—Jerry Smith
Assistant Examiner—Paul Gordon
Attorney, Agent, or Firm—Staas & Halsey

[57] ABSTRACT

A first NC program (NCP1) is created having, in united form for every process (MP1-MP3), tool selection commands (ATC1-ATC3) for automatically selecting tools used in the respective processes and machining comands (MC1-MC3) for machining performed by the tools. The first NC program is stored in a memory of an NC apparatus. The first NC program (NCP1) is then converted into a second NC program (NCP2) having a comand M06T☐☐.△△△ (PTCM1-PTCM3) for holding the tool used in the next process in readiness at a standby position. Thereafter, the NC apparatus executes numerical control based on the second NC program (NCP2). During execution of the second NC program, the NC apparatus inputs, to the machine side, a tool number △△△ of a tool for the next process read before the machining command (MC1-MC3) of the present process, causing an automatic tool changing apparatus to hold the tool for the next process in readiness at a standby position, and then executes machining based on the machining command of the present process.

7 Claims, 6 Drawing Sheets

TOOL CHANGING METHOD

BACKGROUND OF THE INVENTION

1. Field of the Invention

This invention relates to a tool changing method and, more particularly, to a tool changing method in a numerical control unit wherein a tool used in a following process is held in standby at a standby position in concurrence with machining of a present process.

2. Description of the Related Art

As shown in FIG. 6, an NC program for controlling a machine tool having an automatic tool changing apparatus (ATC apparatus) is composed of tool change commands ATCi (M06T▢▢▢;) used in respective ones of machining processes MP1, MP2, MP3, . . . , and machining commands MCi (i=1, 2, . . . ) for machining performed by the tools according to the prior art. In FIG. 6, "M06" is an M-function instruction for an automatic tool change, and "T ▢▢▢" is a tool selection command for a tool having a tool number indicated by ▢▢▢.

However, an NC program with such a configuration cannot be applied to an automatic tool changing apparatus having a function in which a tool used in a following process is held in standby at a standby position in concurrence with machining of a present process. If such an NC program were to be applied, the standby function of the automatic tool changing apparatus would not be capable of fully demonstrating its ability and the tool change would require too much time.

For this reason, in a case where the automatic tool changing apparatus possesses a standby function, the NC program is so arranged that a command PTCi for holding the tool used in the next process at a standby position is inserted ahead of the machining command MCi in the present machining process MPi, and the tool for the next process is held in standby at the standby position in concurrence with the machining of the present process. In accordance with this NC program, the tool used in the next process can be held in standby at the standby position during the machining performed in the present process. Accordingly, when the machining of the present process ends, machining can be performed immediately using the tool held in standby. This is advantageous in that the apparent time required for the tool change can be made zero, as a result of which machining efficiency can be improved.

In such an NC program configuration, however, the programmer must carry out programming while constantly being aware of the tool used in the next process. As a result, programming is troublesome and prone to error. In addition, once the NC program has been created, replacement of a process in the program cannot be performed merely by making the replacement in process units, as in an NC program having the conventional configuration illustrated in FIG. 6. Since the command portion for the tool used in the process must also be changed, program modification processing becomes a troublesome task.

SUMMARY OF THE INVENTION

Accordingly, an object of the present invention is to provide a tool changing method in which the standby function of an automatic tool changing apparatus can be fully exploited, an NC program can be created merely by focusing attention on the present process only without being concerned with other processes, and processes of an NC program can be replaced with ease.

A first NC program is created having, in united form for every process, commands for automatically selecting tools used in respective ones of the processes and machining commands for machining performed by the tools, and this NC program is stored in a memory of an NC apparatus. The first NC program is then converted into a second NC program having a command M06T▢▢▢·△△△ for holding the tool used in the next process in readiness at a standby position. Thereafter, the NC apparatus executes numerical control based on the second NC program. That is, the NC apparatus inputs, to the machine side, a tool number △△△ of a tool for the next process read before the machining command of the present process, causes an automatic tool changing apparatus to hold the tool for the next process in readiness at a standby position, and executes machining based on the machining command of the present process.

DESCRIPTION OF THE PREFERRED EMBODIMENT

Figure 1:
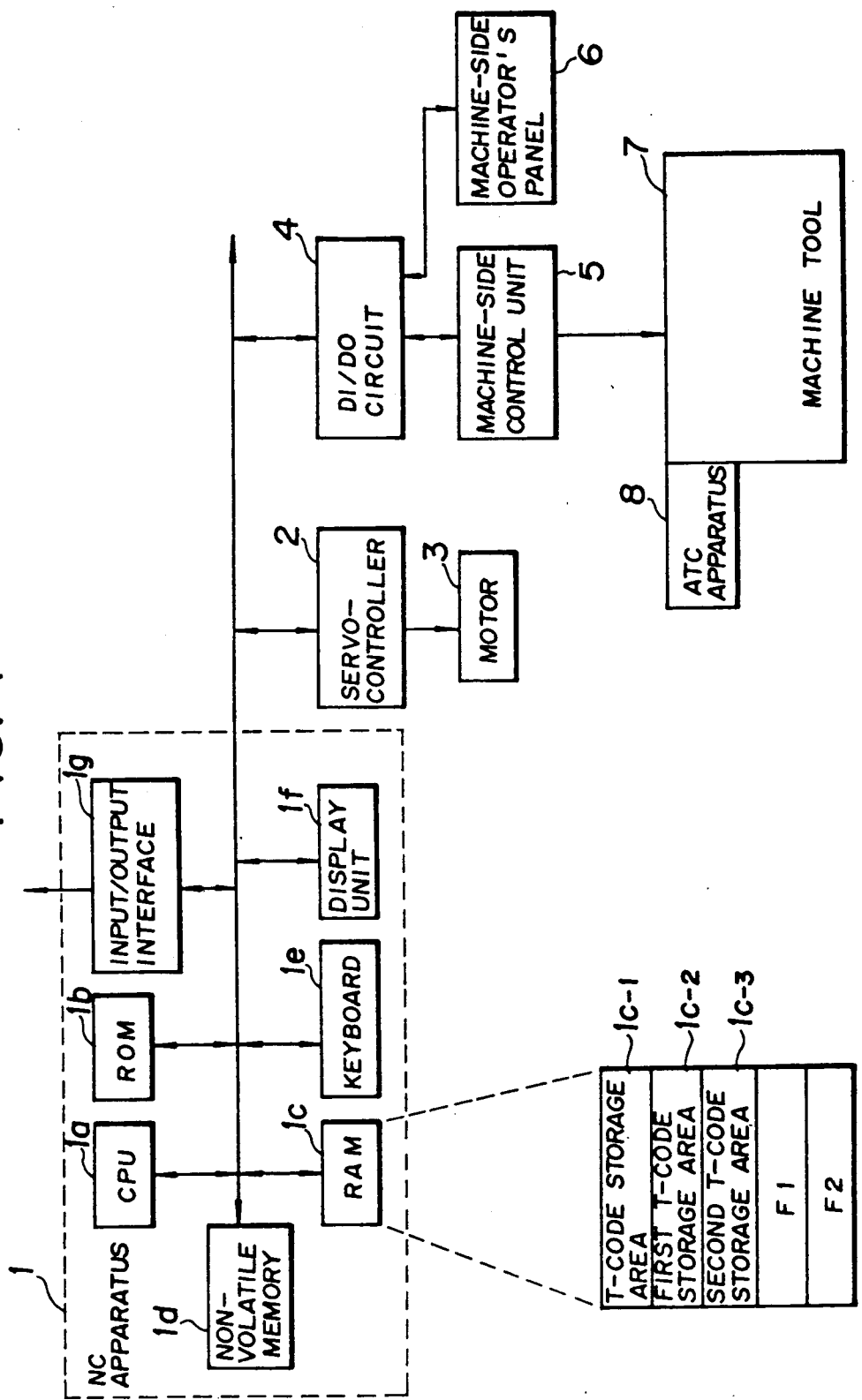
FIG. 1 is a block diagram of a system for practicing a method according to the present invention.
Figure 2:
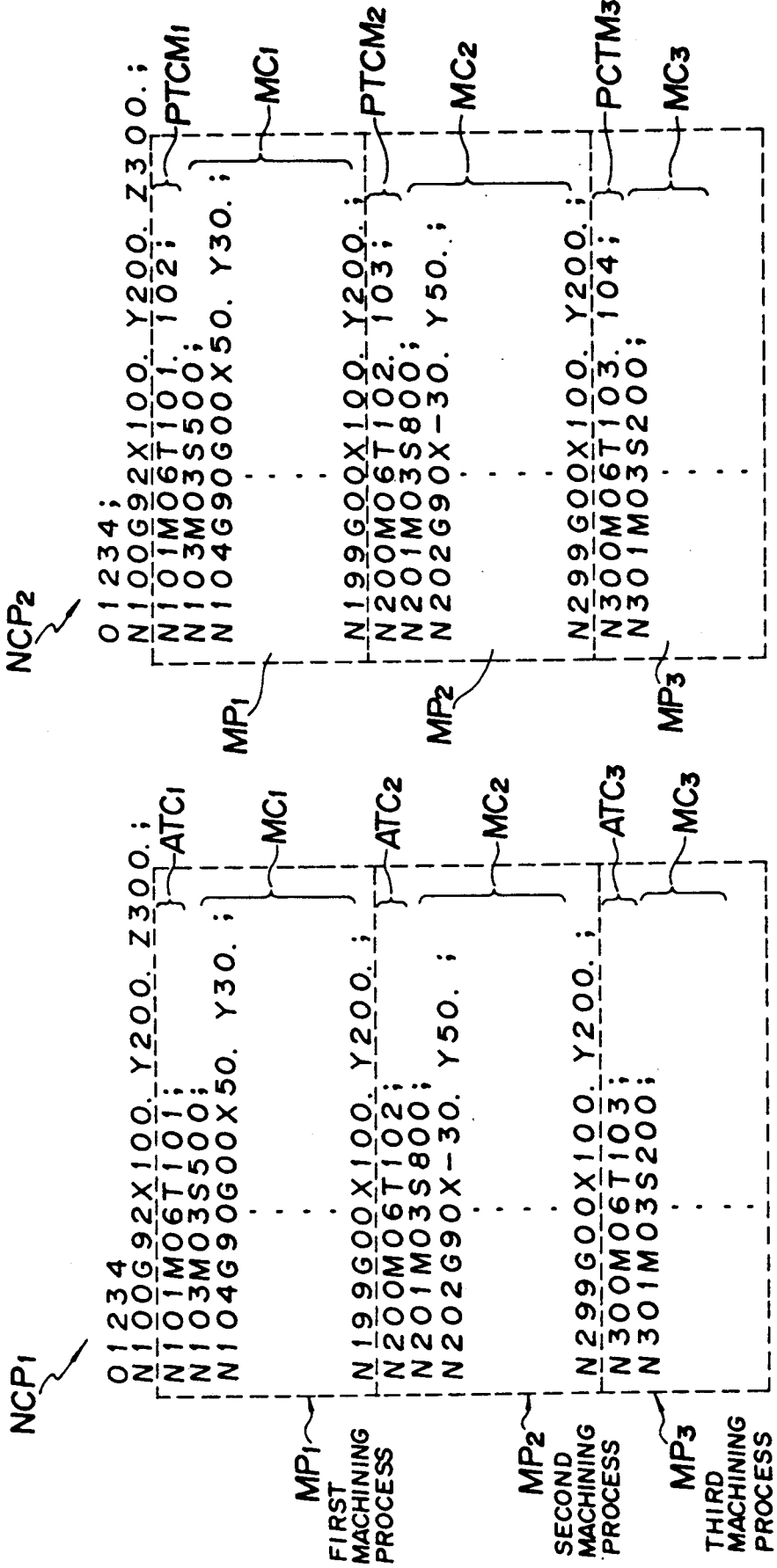
FIG. 2(a) is an example of an NC program configuration according to the present invention.
FIG. 2(b) is an example of an NC program configuration after conversion.

FIG. 1 is a block diagram of a system for practicing a method according to the present invention, FIG. 2(a) is an example of an NC program configuration according to the present invention, and FIG. 2(b) is an example of an NC program configuration after conversion.

Numeral 1 denotes the main body of an NC apparatus which has a processor 1a, a program memory (ROM) 1b for storing a control program, a RAM 1c for storing the results of processing as well as an NC program presently being run, a non-volatile memory (e.g., a bubble memory) 1d for preserving various parameters and NC programs, a keyboard 1e and display device 1f constituting a manual data input unit (MDI unit), and an input/output interface 1g for administering an exchange of data with an NC program input/output unit (e.g., a paper tape reader/puncher), not shown.

Figure 6:
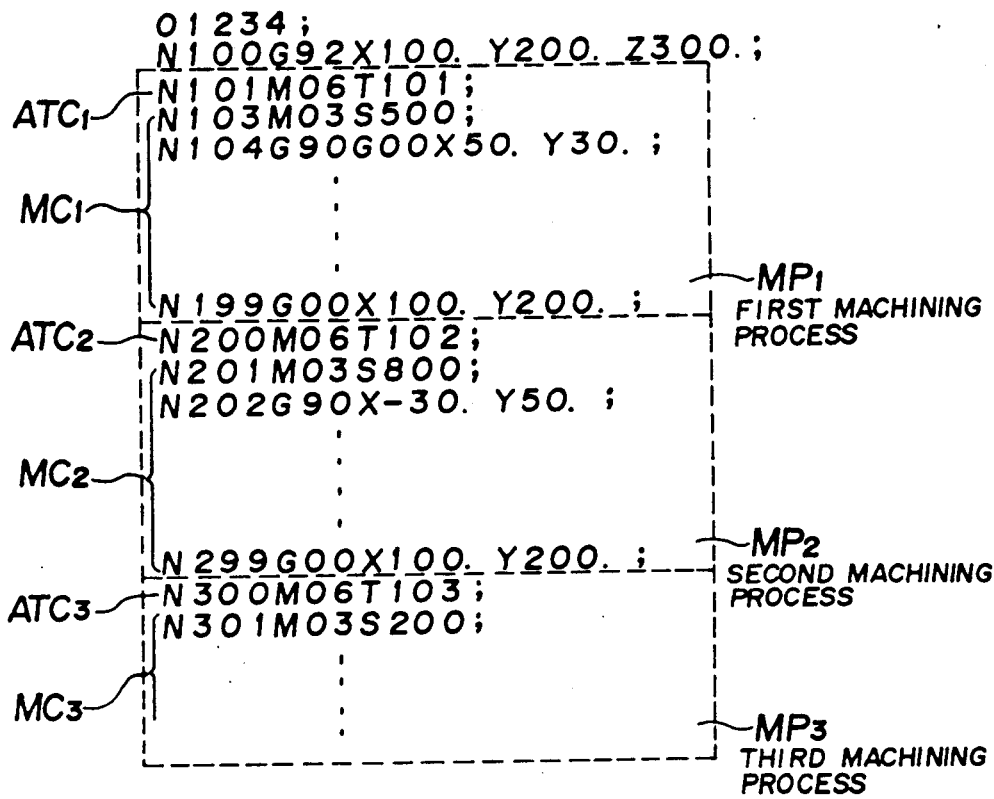
FIGS. 6 and 7 are examples of program configurations according to the prior art.
Figure 7:
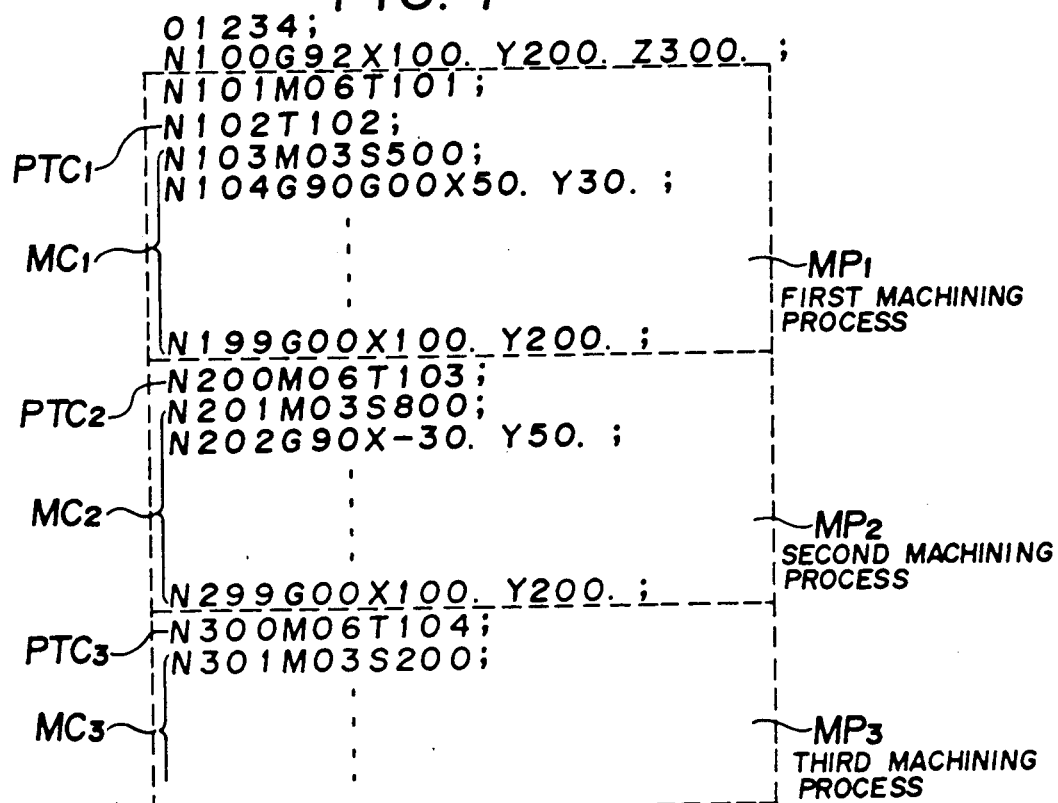

An NC program is entered from an external unit via the input/output interface 1g, from the keyboard 1e or from the non-volatile memory 1d, and the NC program is stored in a predetermined area of a RAM 1c. As shown in FIG. 2(a), an NC program has the same configuration as the conventional NC program shown in FIG. 6. That is, the program is composed of commands ATCi (M06T▢▢▢;) which cause an automatic tool changing (ATC) apparatus 8 to change tools used in respective ones of machining processes MP1, MP2, MP3, . . . , and machining commands MCi (i=1, 2, . . . ) for machining performed by the tools. The first NC program NCP1 having the foregoing configuration is stored in the RAM 1c after being converted as described below into a second NC program NCP2, which has the configuration shown in FIG. 2(b). The second NC program NCP2 has tool change commands PTCMi each for designating a tool used in the present process and in the next process. The PTCMi commands are placed ahead of the machining commands MCi in the present processes MPi (i=1, 2, 3, ...). For example, in a tool change command (M06T▭·△△△), ▭ is the number of the tool of the present process, △△△ is the number of the tool of the next process, and the dot "." is a decimal point which acts as a delimiter.

Returning to FIG. 1, numeral 2 denotes a servo-controller which includes a pulse distribution circuit, a servo circuit and the like. Numeral 3 denotes a motor, 4 an interface, e.g., a DI/DO circuit, for performing an exchange of data with the machine side, 5 a control unit on the machine side, 6 an operator's panel on the machine side, 7 a machine tool, and 8 the automatic tool changing appratus (ATC apparatus) equipped with a standby function.

Figure 3:
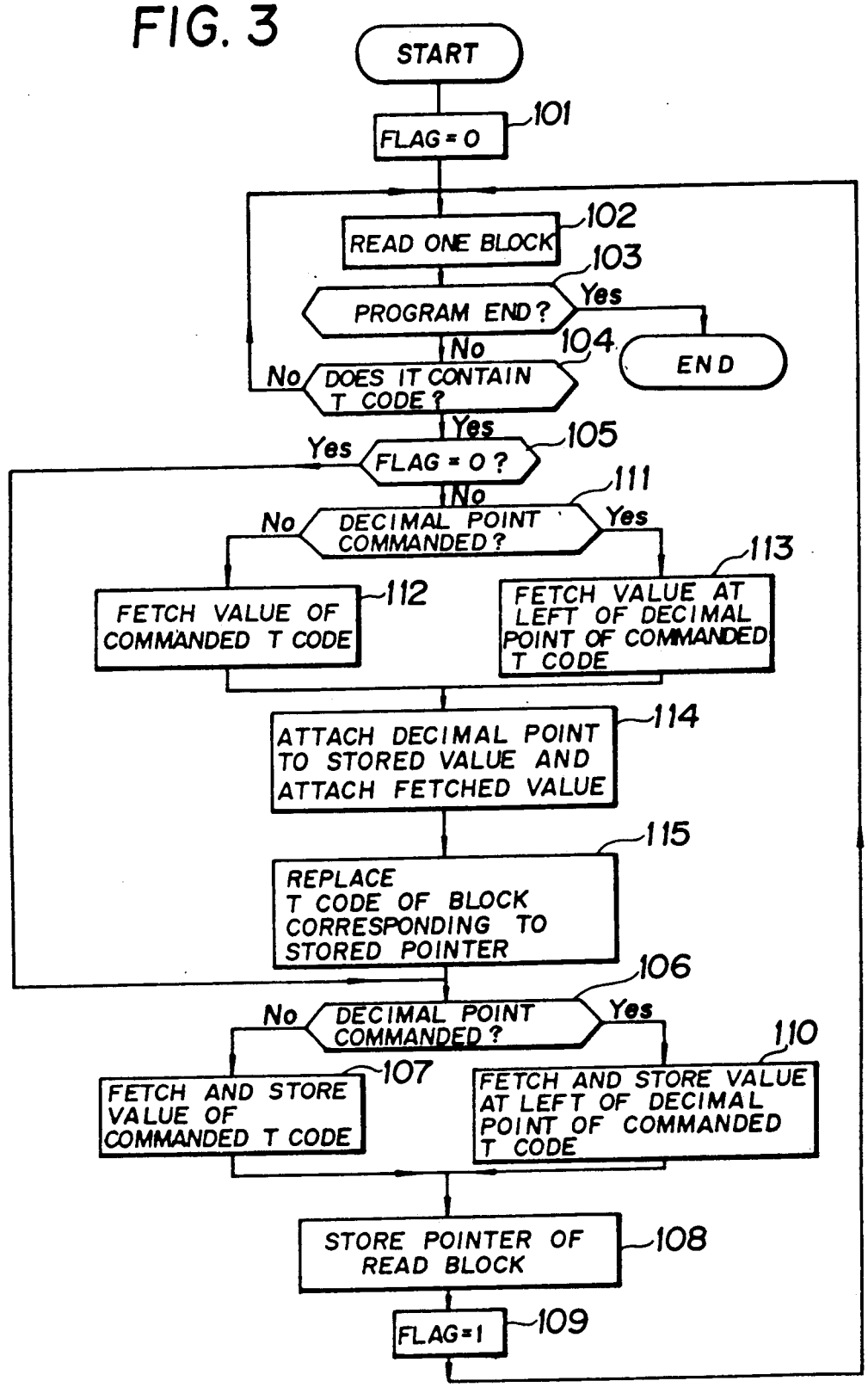
FIG. 3 is a flowchart of NC program conversion processing.
Figure 4:
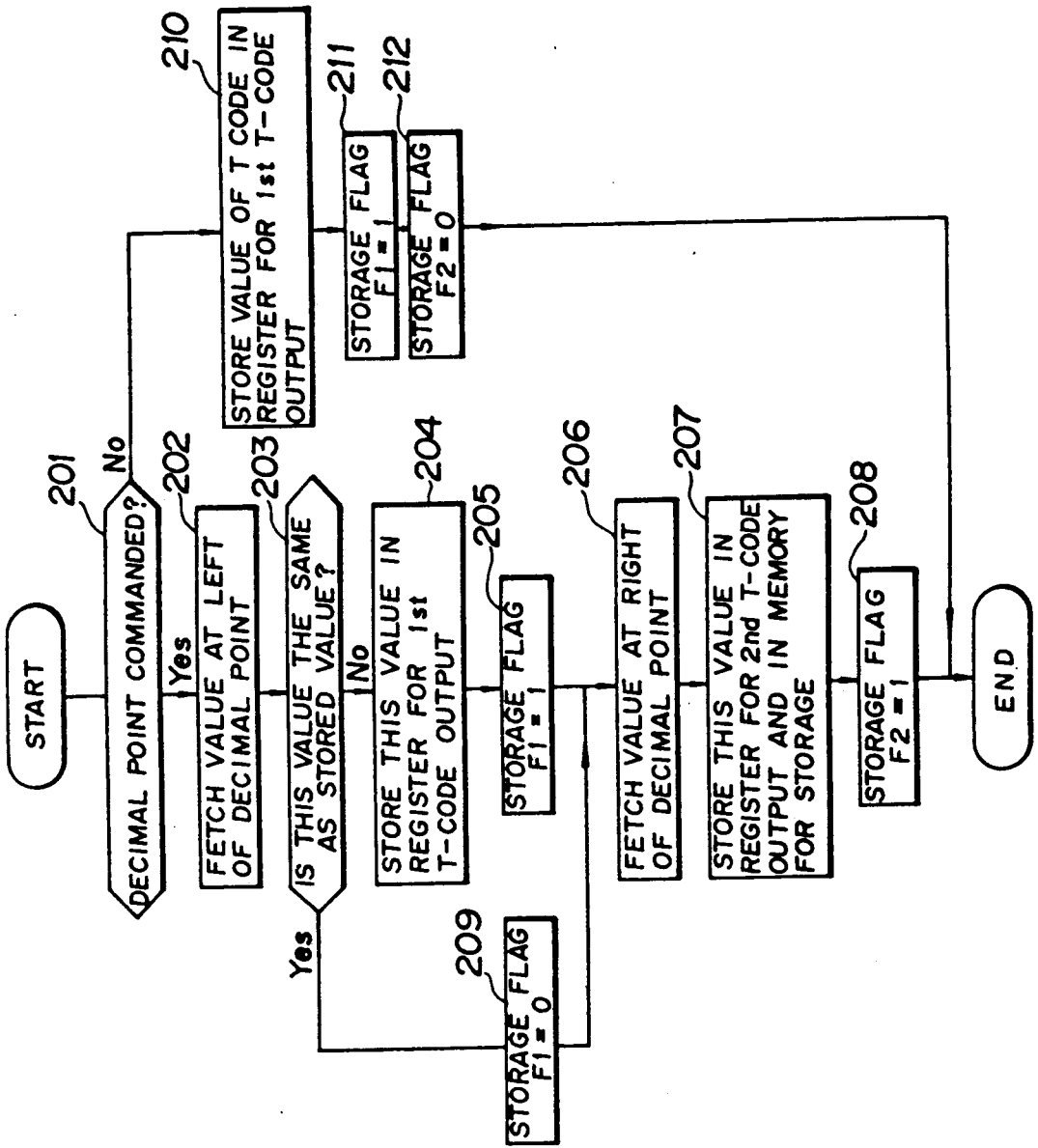
FIG. 4 is a flowchart of processing in a case where a tool change is commanded.
Figure 5:
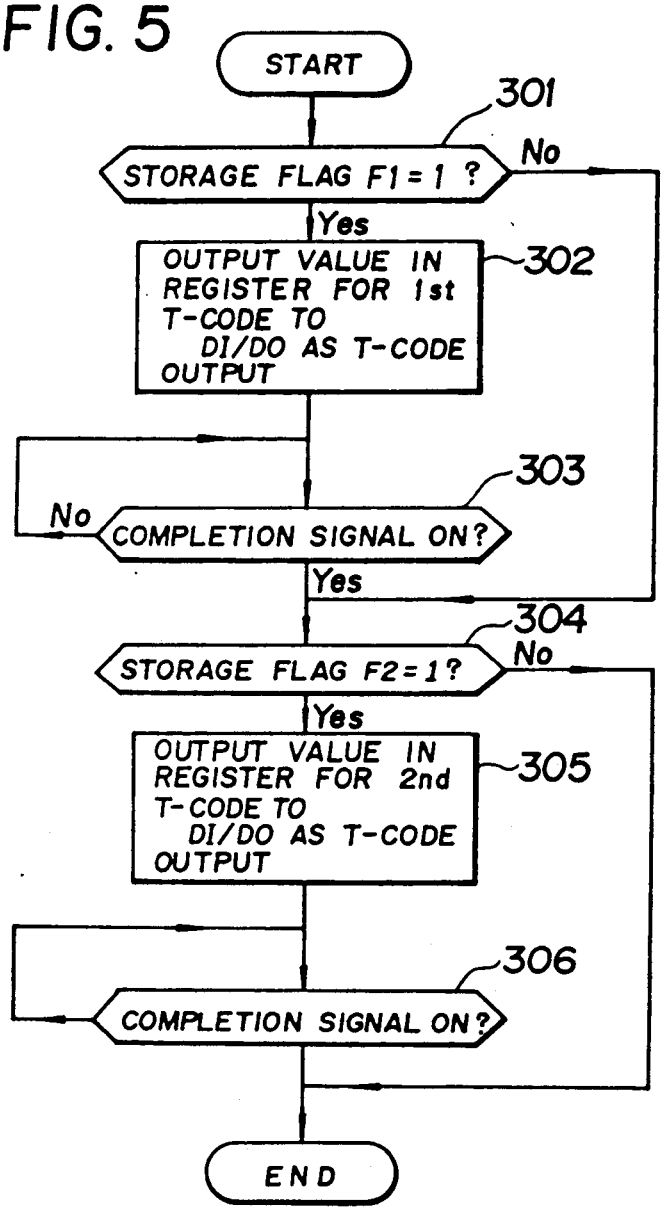
FIG. 5 is a flowchart of processing for outputting a tool number signal to a machine side.

FIG. 3 is a flowchart of NC program conversion processing, FIG. 4 is a flowchart of processing in a case where a tool change is commanded during execution of numerical control, and FIG. 5 is a flowchart of processing for outputting a tool number to the machine side. A method of changing tools according to the invention will now be described in accordance with FIGS. 1 through 5.

(a) Conversion processing (see the flowchart of FIG. 3)

A case will be described in which the first NC program NCP1, which has the commands ATCi for automatically changing tools used in respective ones of machining processes, and the machining commands MCi for machining performed by the tools, as shown in FIG. 2(a), is converted into the second NC program NCP2 having the commands PTCMi each for designating a tool used in the present process and in the next process, these commands being placed ahead of the machining commands MCi in the present processes, as shown in FIG. 2(b). The conversion processing of FIG. 3 can also be applied to a case where the tool change command formats shown in FIGS. 2(a), (b) are mixed. It should be noted that the second NC program NCP2 is identical with the first NC program NCP1 if the numbers to the right of the decimal points in the second NC program are not taken into account.

When program conversion is commanded, the processor 1a sets a flag F to "0" (step 101), reads one block of NC data (step 102) and checks to see whether the read NC data is data indicative of the end of the program (step 103). If the answer is "YES", then conversion processing is terminated; if "NO", then it is checked to see whether the data contains a T code (step 104). If the data does not contain the T code, the processing from step 102 onward is repeated with regard to the next block of NC data.

If the data is found to contain the T code in step 104, the processor checks to see whether the flag F is "0" (step 105).

Since F="0" holds initially, the program jumps to step 106, where the T code is checked to see whether it contains a decimal point (step 106). If it does not contain a decimal point, the value (tool number ▭) of the commanded T code is fetched and preserved (step 107). In addition, a pointer indicating the address of the RAM 1c which is storing the single block of NC data containing the T code is preserved (step 108). Thereafter, the flag F is made "1", after which the processing from step 102 onward is repeated. If the T code is found to contain the decimal point in step 106, the tool number to the right of the decimal point is neglected and the tool number to the left of the decimal point is fetched and preserved (step 110), after which processing from step 108 onward is performed.

If the conditon flag="1" holds at step 105, or in other words, if a T code from the second T code onward has been read, a check is performed to see whether the T code contains a decimal point (step 111). If it does not contain a decimal point, the commanded tool number ▭ is fetched (step 112); if it does contain the decimal point, then the tool number to the left of the decimal point is fetched (step 113). Next, a decimal point is attached to the tool number preserved at step 107 or 110, and then the tool number fetched at step 112 or 113 is attached (step 114). Thereafter, the T code stored at the address of RAM 1c designated by the pointer stored at step 108 is replaced (step 115) by the T code generated at step 114. This is followed by repeating the processing from step 106 onward.

(b) Processing when tool change is commanded (see FIG. 4)

When the NC program having the format shown in FIG. 2(b) has been obtained, numerical control is executed based on this NC program. When an automatic tool change command is read during execution of this numerical control program, the processing shown in FIG. 4 is executed. The processing of FIG. 4 can be applied to an NC program having the format of FIG. 2(a) or 2(b).

When an automatic tool change command is read during execution of numerical control based on the NC program, the processor 1a checks to see whether the T code contains a decimal point (step 201).

In a case where the automatic tool change command contains a decimal point, as indicated by

M06T▭·△△△;

the tool number ▭ to the left of the decimal point is fetched (step 202) and a check is performed to determine whether this tool number agrees with a tool number (the initial value of which is zero) stored in a T-code storage area 1c-1 (see FIG. 1) of RAM 1c (step 203).

If agreement is not found at step 203, or in other words, if a T code is read out the first time, the above-mentioned tool number ▭ is stored in a first T-code storage area 1c-2 and a storage flag F1 is set to "1" (steps 204, 205).

Thereafter, the tool number △△△ to the right of the decimal point is fetched (step 206), this tool number △△△ is stored in a second T-code storage area 1c-3 and in the T-code storage area 1c-1 (step 207), and a storage flag F2 is made "1" (step 208).

Thereafter, in accordance with the flowchart of FIG. 5, described below, the tool number ▭ stored in the first T-code storage area 1c-2 is inputted to the machine-side control unit 5 via the DI/DO circuit 4, the tool whose tool number is ▭ is selected by the automatic tool changing apparatus 8, the tool number △△△ stored in the second T-code storage area 1c-3 is similarly output to the machine side via the DI/DO circuit at the completion of the selection of the tool having tool number ▭, and the tool having tool number △△△ is made to standby at the standby position. When the next tool change command is read out at the end of machining of the present process, processing is repeated from step 201 onward in FIG. 4.

The foregoing relates to the case of the first tool change command to be read out. However, in the case of a tool change command read out from the second tool change command onward, the tool number to the left of the decimal point of the T code contained in the command will agree with the tool number to the right of the decimal point read out previously and stored in the T-code storage 1c-1. Accordingly, the processing of steps 204 and 205 is not performed with respect to tool change commands from the second onward. Instead, the storage flag F1 is made "0" (step 209), then the processing from step 206 onward is executed. Thereafter, in accordance with the flowchart of FIG. 5, only the tool number ΔΔΔ stored in the second T-code storage area 1c-3 is outputted to the machine side and the tool having this tool number ΔΔΔ is made to standby at the standby position after the tool already standing by is selected.

The foregoing relates to processing in accordance with an NC program in which a T code includes a decimal point. However, in a case where an NC program does not contain a decimal point, as shown in FIG. 2(a), a T code (tool number) is stored in the first T-code storage area 1c-2, and the storage flags F1, F2 are set respectively to "1", "0", whenever a tool change command is read out (steps 210-212).

(c) Processing for outputting tool number to machine side (see FIG. 5)

When predetermined tool numbers have been stored in the storage areas 1c-1 through 1c-3 and the storage flags F1, F2 set by the processing in accordance with FIG. 4, the processor 1a executes output processing for outputting the tool numbers to the machine side in accordance with FIG. 5.

At the end of the processing shown in FIG. 4, it is checked to see whether the storage flag F1 is "1" (step 301). If NC control is being performed based on the second NC program [see FIG. 2(b)] in which the T code contains a decimal point, the storage flag F1 will be "1" and the tool numbers ☐☐☐, ΔΔΔ will have been stored in the first and second T-code storage areas 1c-2, 1c-3 at the end of the processing of FIG. 4 only when the initial tool change command has been read out.

If the tool change command is the initial command and, hence, F1 is found to be "1" at step 301, then the processor 1a outputs the tool number ☐☐☐, which has been stored in the first T-code storage area 1c-2, to the machine-side control unit 5 via the DI/DO circuit 4, and the automatic tool changing apparatus 8 changes the old tool for the new tool having the tool number ☐☐☐ (step 302). Note that if the tool change command is one from the second onward, then the processing of steps 301-303 onward is skipped.

When selection of the new tool is completed, the machine-side control unit 5 returns a signal indicative of tool change completion to the NC apparatus via the DI/DO circuit 4. Thus, the processor 1a checks to see whether the completion signal has been received (signal ON?) (step 303). If the completion signal is ON, then it is checked to see whether the storage flag F2 is "1" (step 304).

If the second flag F2 is "1", then the tool number ΔΔΔ used in the next process and stored in the second T-code storage area 1c-3 is output to the machine-side control unit 5 via the DI/DO circuit 4 (step 305).

When the machine-side control unit 5 receives the tool number of the tool used in the next process, it immediately returns the completion signal to the NC apparatus. In response to receipt of the completion signal, the NC apparatus reads the next block of NC data out of the RAM 1c, continues numerical control processing and causes the machine tool 7 to perform machining with the new tool. Meanwhile, in concurrence with machining, the automatic tool changing apparatus 8 makes the tool for the next process stand by at the standby position. If the NC program is of the format shown in FIG. 2(a), processing solely of steps 301 through 303 is executed.

Thus, in accordance with the present invention, a first NC program having, in combined form for every process, a command for automatically selecting a tool and a machining command for machining performed by the tool, is converted into a second NC program having a command for holding the tool used in the next process in readiness at a standby position. When the second NC program obtained by the conversion is executed, the tool number of the tool used in the next process is output to the machine side before the machining of the present process is performed, and an automatic tool changing apparatus is caused to hold the tool for the next process in readiness at a standby position in concurrence with the machining of the present process. As a result of this arrangement, the standby function of the automatic tool changing apparatus can be fully exploited, an NC program can be created without the operator being concerned with other processes, and replacement of processes in the NC program can be performed with ease merely by exchanging portions of the first NC program in process units.

What is claimed is:

1. A tool changing method for a numerical control apparatus performed in concurrence with machining of a workpiece by a present process, said method including holding a next tool, used in a next process for machining the workpiece, at a standby position of an automatic tool changer, said method comprising the steps of:

(a) converting a first numerical control program having, in united form for every process, a tool change command for automatically changing an old tool for a new tool and a machining command for instructing machining performed by the new tool, into a second numerical control program having a command for making the next tool used in the next process stand by at the standby position;

(b) executing the second numerical control program obtained by said converting in step (a);

(c) outputting to a machine side a tool number of the next tool used in the next process before machining is performed in accordance with the machining command of the present process; and (d) making the next tool used in the next process stand by at the standby position in concurrence with the machining of the present process.

2. A tool changing method according to claim 1, wherein a standby command for the next tool used in the next process is inserted ahead of the machining command of the present process in the second numerical control program.

3. A tool changing method according to claim 1, wherein the tool change command and the standby command for the next tool used in the next process are expressed in a single numerical control data format and inserted ahead of the machining command of the present process in the second numerical control program.

4. A tool changing method according to claim 3, wherein the first numerical control program is converted into the second numerical control program by replacing the tool change command with a command having the single numerical control data format.

5. A method for generating a numerical control program for machining a workpiece, comprising the steps of:
   (a) inputting a first numerical control program defining processes, each process including a tool change command followed by at least one machining command; and
   (b) converting the first numerical control program into a second numerical control program by converting the tool change command in each process into a combined tool change command identifying a first tool to be used during machining of the workpiece controlled by the at least one machining command following the tool change command and a second tool to be held in a stand-by position until a following process for machining the workpiece is performed.

6. A method for generating a numerical control program, comprising the steps of:
   (a) inputting a first numerical control program defining processes, each process including a tool change command followed by at least one machining command; and
   (b) converting the first numerical control program into a second numerical control program by converting the tool change command in each process into a combined tool change command identifying a first tool to be used during machining controlled by the at least one machining command following the tool change command and a second tool to be held in a stand-by position until a following process is performed, said converting including the substeps of:
      (b1) determining whether a command input in step (a) is a tool change command;
      (b2) storing a tool number included in an initial tool change command in the first numerical control program in a temporary storage area;
      (b3) repeating step (b1) until a next tool change command is identified;
      (b4) adding a delimiter and the tool number in the next tool command after the tool number in the tool command corresponding to the tool number stored in the temporary storage area;
      (b5) storing the tool number of the next tool command in the temporary storage area; and
      (b6) repeating steps (b3)-(b5) until all tool commands have been input in step (a).

7. A method for performing numerical control processing, comprising the steps of:
   (a) inputting a numerical control program defining processes, each process including a tool change command followed by at least one machining command, the tool change command containing first and second tool numbers identifying first and second tools, respectively, the first tool to be used in the process and the second tool to be used in a next process;
   (b) storing the second tool number in a standby register when the tool change command is executed;
   (c) comparing the first tool number of the tool change command with the second tool number of an immediately previous tool change command stored in the standby register;
   (d) storing the first tool number in an execution register and indicating that a tool change must occur when said comparing in step (b) determines that the first tool number of the tool change command is different from the second tool number of the immediately previous tool change command;
   (e) indicating that the second tool corresponding to the second tool number of the immediately previous tool change command should be used as the first tool of the process including the tool change command when said comparing in step (b) determines that the first tool number of the tool change command matches the second tool number of the immediately previous tool change command;
   (f) performing machining using the first tool under control of the at least one machining command included in the process;
   (g) controlling selection of the second tool for holding in a stand-by position during machining using the first tool; and
   (h) repeating steps (b)-(g) for all processes in the numerical control program.

* * * * *